United States Patent
Ramos et al.

(10) Patent No.: US 6,246,048 B1
(45) Date of Patent: Jun. 12, 2001

(54) METHODS AND APPARATUS FOR MECHANICALLY ENHANCING THE SENSITIVITY OF LONGITUDINALLY LOADED FIBER OPTIC SENSORS

(75) Inventors: Rogerio T. Ramos, Bethel; Raghu Madhavan, Brookfield; Tsutomu Yamate, Brookfield; Stephen C. Balkunas, Brookfield; Robert J. Schroeder, Newtown, all of CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 09/313,603

(22) Filed: May 18, 1999

(51) Int. Cl.$^7$ ................................................. H01J 5/16
(52) U.S. Cl. .............................. 250/227.18; 250/227.21; 385/77
(58) Field of Search .................... 250/227.14, 227.17, 250/227.18, 227.21; 356/32, 35.5; 385/77, 85

(56) References Cited

U.S. PATENT DOCUMENTS

| | | | |
|---|---|---|---|
| 4,593,969 | 6/1986 | Goodman et al. | 350/96.19 |
| 4,755,668 | 7/1988 | Davis | 250/227 |
| 4,834,493 | * 5/1989 | Cahill et al. | 385/77 |
| 5,026,984 | 6/1991 | Gerdt | 250/227.21 |
| 5,646,401 | * 7/1997 | Udd | 250/227.18 |
| 5,841,131 | * 11/1998 | Schroeder et al. | 250/227.17 |
| 5,844,667 | 12/1998 | Maron | 356/35.5 |

FOREIGN PATENT DOCUMENTS

| | | | |
|---|---|---|---|
| 41 14 199 | 11/1992 | (DE) | G01K/11/18 |
| 196 48 403 C1 | 4/1998 | (DE) | G01L/1/24 |
| 198 07 891 A1 | 8/1999 | (DE) | G01L/11/02 |
| 0 538 779 A2 | 10/1992 | (EP) | G01D/5/26 |
| 0 525 717 A1 | 2/1993 | (EP) | G01N/19/10 |
| WO98/31987 | 7/1998 | (WO) | G01D/5/353 |
| WO 99/32911 | 7/1999 | (WO) | G02B/6/16 |

OTHER PUBLICATIONS

Xu, M.G. et al. *Optical In–Fibre Grating High Pressure Sensor.* Electronics Letters. vol. 29, No. 4, (1993), pp. 398–399.

Xu, M.G. et al. *Fibre Grating Pressure Sensor with Enhanced Sensitivity Using a Glass–Bubble Housing.* Electronics Letters. vol. 32, No. 2, (1993), pp. 128–129.

* cited by examiner

*Primary Examiner*—Stephone B. Allen
(74) *Attorney, Agent, or Firm*—William B. Batzer; David P. Gordon

(57) ABSTRACT

An optical fiber is provided with a Bragg grating formed along a portion of its core and a mechanical structure arranged adjacent to the Bragg grating for amplifying longitudinal strain on the fiber in the vicinity of the grating. The mechanical structure is designed to convert ambient pressure into longitudinal strain on the fiber in the vicinity of the grating and to allow the fiber to pass through the structure so that several pressure measuring apparatus may be arranged along a single optical fiber. An intermediate structure is provided between the fiber and the mechanical structure for minimizing buckling of the fiber. The methods of the invention include converting pressure into longitudinal strain on an optical fiber, amplifying the effect of pressure on the longitudinal strain, measuring pressure by determining the spectral location related to peaks (or minimums) of light reflected from an optical grating subjected to longitudinal strain.

36 Claims, 3 Drawing Sheets

METHODS AND APPARATUS FOR MECHANICALLY ENHANCING THE SENSITIVITY OF LONGITUDINALLY LOADED FIBER OPTIC SENSORS

BACKGROUND OF THE INVENTION

1. Field of the Invention

The invention relates to fiber optic sensors. More particularly, the invention relates to methods and apparatus for mechanically enhancing the sensitivity of longitudinally loaded fiber optic sensors and for converting pressure or temperature to longitudinal strain on a fiber optic sensor.

2. State of the Art

Fiber optic sensor technology has developed concurrently with fiber optic telecommunication technology. The physical aspects of optical fibers which enable them to act as wave guides for light are affected by environmental influences such as temperature, pressure, and strain. These aspects of optical fibers which may be considered a disadvantage to the telecommunications industry are an important advantage to the fiber optic sensor industry.

Optical fibers, whether used in telecommunications or as environmental sensors, generally include a cylindrical core, a concentric cylindrical cladding surrounding the core, and a concentric cylindrical protective jacket or buffer surrounding the cladding. The core is made of transparent glass or plastic having a certain index of refraction. The cladding is also made of transparent glass or plastic, but having a different, smaller, index of refraction. The ability of the optical fiber to act as a bendable waveguide is largely determined by the relative refractive indices of the core and the cladding.

The refractive index of a transparent medium is the ratio of the velocity of light in a vacuum to the velocity of light in the medium. As a beam of light enters a medium, the change in velocity causes the beam to change direction. More specifically, as a beam of light travels from one medium into another medium, the beam changes direction at the interface of the two media. In addition to changing direction at the interface of two media, a portion of the incident beam is reflected at the interface such that the energy of the beam travelling through the second medium is diminished (the sum of the energy of the refracted and reflected beams must equal the energy of the incident beam). The angles of reflection and refraction can be predicted using Snell's law if the refractive indices of both media are known.

By altering the indices of refraction of two adjacent media, the angle of refraction and the angle of reflection of a beam travelling toward the interface of the two media can be altered such that the intensity of the light entering the second medium approaches zero and substantially all of the light is reflected at the interface. Conversely, for any two transparent media, there is a critical angle of incidence at their interface at or below which substantially all of the incident light will be reflected. This phenomenon, known as total internal reflection, is applied in choosing the refractive indices of the core and the cladding in optical fibers so that light may propagate through the core of the fiber with minimal power loss.

As mentioned above, fiber optic sensors employ the fact that environmental effects can alter the amplitude, phase, frequency, spectral content, or polarization of light propagated through an optical fiber. The primary advantages of fiber optic sensors include their ability to be light weight, very small, passive, energy efficient, rugged, and immune to electromagnetic interference. In addition, fiber optic sensors have the potential for very high sensitivity, large dynamic range, and wide bandwidth. Further, a certain class of fiber sensors may be distributed or multiplexed along a length of fiber. They may also be embedded into materials.

State of the art fiber optic sensors can be classified as either "extrinsic" or "intrinsic". Extrinsic sensors rely on some other device being coupled to the fiber optic in order to translate environmental effects into changes in the properties of the light in the fiber optic. Intrinsic sensors rely only on the properties of the optical fiber in order to measure ambient environmental effects. Known fiber optic sensors include linear position sensors, rotational position sensors, fluid level sensors, temperature sensors, strain gauges, fiber optic gyroscopes, and pressure sensors.

One type of fiber optic sensor utilizes intra-core fiber gratings. Intra-core Bragg gratings are formed in a fiber optic by doping an optical fiber with material such as germania and then exposing the side of the fiber to an interference pattern to produce sinusoidal variations in the refractive index of the core. Two presently known methods of providing the interference pattern are by holographic imaging and by phase mask grating. Holographic imaging utilizes two short wavelength (usually 240 nm) laser beams which are imaged through the side of a fiber core to form the interference pattern. The bright fringes of the interference pattern cause the index of refraction of the core to be "modulated" resulting in the formation of a fiber grating. Similar results are obtained using short pulses of laser light, writing fiber gratings line by line through the use of phase masks. By adjusting the fringe spacing of the interference pattern, the periodic index of refraction can be varied as desired.

It has been demonstrated that an ultrahigh hydrostatic pressure induces fractional changes in the physical length of a fiber optic and thus induces a fractional change in the Bragg wavelength of a grating incorporated in the fiber core. For example, M. G. Xu et al., Optical In-Fibre Grating High Pressure Sensor, Electron. Lett., Vol. 29, No. 4, pp. 398–399 (1993), demonstrates how a fiber optic Bragg grating sensor can be used to measure very high pressure. In particular, the Xu et al. paper demonstrates a simple in-fiber grating sensor which exhibits a linear Bragg wavelength shift of $3.04 \times 10^{-3}$ nm/MPa. The authors note that the sensor is also sensitive to changes in temperature. They note a linear Bragg wavelength shift of $10.45 \times 10^{-3}$ nm/° C. and specifically state that far more compensation for the effects of temperature is necessary for their sensor to be valuable as a pressure sensor and that the real advantage of their sensor is only evident at ultrahigh pressure.

It has been suggested that a mechanical structure be attached to a Bragg grating sensor in order to enhance its sensitivity to pressure. For example, M. G. Xu et al., Fibre Grating Pressure Sensor with Enhanced Sensitivity Using a Glass-Bubble Housing, Electron. Lett., Vol. 32, No. 2, pp. 128–129 (1993), demonstrates how pressure sensitivity is enhanced by housing the fiber with Bragg grating in a glass bubble. When the glass bubble is pressurized, the fractional change in the diameter of the glass bubble $\Delta d/d$ owing to a pressure change $\Delta P$ is given by Equation 1 where E is the Youngs modulus of the bubble, $\mu$ is the Poisson ratio of the bubble, and t is the wall thickness of the bubble.

$$\frac{\Delta d}{d} = -\frac{d(1-\mu)}{4Et}\Delta P \qquad (1)$$

If there is good bonding between the fiber and the glass bubble, the pressure induced strain on the grating is equal to the fractional change in the diameter of the glass bubble $\Delta d/d$. The pressure sensitivity, defined as the fractional change in the Bragg wavelength $\Delta \lambda_B/\lambda_B$ is given by Equation 2 where $P_e = 0.22$ is the effective photoelastic constant for silica.

$$\frac{\Delta \lambda_B}{\lambda_B} = (1-p_e)\frac{\Delta d}{d} = 0.17\,\frac{d(1-\mu)}{Et}\Delta P \qquad (2)$$

The glass bubble increased pressure sensitivity of the Bragg grating by a factor of four. It would seem, however, that the glass bubble structure would not be suitable for use in harsh environments.

WO 98/31987 to Maron et al. discloses a multiparameter fiber optic sensor for use in harsh environments such as in the borehole of an oil well. The sensor generally includes a fiber optic having three or four spaced apart Bragg gratings all mounted in a single capillary tube with a diaphragm bonded to one end of the capillary tube. Various materials are located between the fiber optic and the capillary tube along the length of the capillary tube and adjacent the Bragg gratings. The three or four spaced apart Bragg gratings provide a pressure sensor, an acceleration (or vibration) sensor, and a temperature sensor. Each of the sensors is isolated from the other sensors by "rigid elements" located between the fiber optic and the capillary tube. The pressure sensor is activated by the diaphragm at the end of the capillary tube which causes material surrounding the closest Bragg grating to place an axial strain on the Bragg grating. The acceleration sensor is activated by a free moving mass which impacts a rigid member adjacent to the next Bragg grating and axially strains the grating in proportion to the acceleration of the mass. The temperature sensor(s) are formed by one or two Bragg gratings adjacent one or two rigid members near the end of the tube opposite the end having the diaphragm. One of the disadvantages of the multiparamter sensor described by Maron et al. is that the pressure sensor must be located at the end of the device with a diaphragm arranged orthogonal to the end of the fiber optic. This prevents the arrangement of several pressure sensors along a single fiber optic unless beam splitters are used to branch out the fiber. As mentioned above, one of the inherent advantages of Bragg grating fiber optic sensors is that many sensors may be arranged along a long length of single fiber through the use of wavelength or time division multiplexing.

SUMMARY OF THE INVENTION

It is therefore an object of the invention to provide methods and apparatus for enhancing the sensitivity of fiber optic sensors.

It is also an object of the invention to provide methods and apparatus for enhancing the sensitivity of longitudinally loaded fiber optic sensors.

It is another object of the invention to provide methods and apparatus for mechanically enhancing the sensitivity of longitudinally loaded fiber optic sensors.

It is an additional object of the invention to provide a fiber optic pressure or temperature sensor which has the advantages of a longitudinally loaded fiber optic strain sensor.

It is also an object of the invention to provide fiber optic pressure sensors which may be coupled to each other along a single fiber.

In accord with these objects which will be discussed in detail below, the methods and apparatus of the present invention include an optical fiber with a Bragg grating formed along a portion of its core and a mechanical structure arranged adjacent to the Bragg grating for increasing longitudinal strain on the fiber in the vicinity of the grating, and an intermediate structure disposed between the fiber and the mechanical structure to prevent the fiber from buckling. In particular, the mechanical structure is designed to convert pressure or temperature ambient to the mechanical structure into longitudinal strain on the fiber in the vicinity of the grating.

The methods of the invention include converting the effect of pressure or temperature on a mechanical structure into longitudinal strain on an optical fiber, amplifying the effect of the pressure on the longitudinal strain, while preventing the fiber from buckling, and measuring the pressure by determining the wavelength of the spectral peak (or minimum) of light reflected from an optical grating subjected to longitudinal strain.

According to a first embodiment, the mechanical structure includes a tube which is placed over the fiber optic with the Bragg grating being located around the midpoint of the tube, a soft filling material between the tube and the fiber optic, and two end sealings which physically couple the ends of the tube to portions of the fiber optic adjacent to the ends of the tube. When the tube is exposed to an increase in ambient pressure, the entire tube is compressed, the end sealings are moved closer together and the fiber optic is longitudinally compressed. The filling material prevents the fiber from buckling. The compression of the optic results in a longitudinal compression of the Bragg grating which results in a shift in the wavelength of the spectral peak reflected from the grating. An increase in pressure results in a shortening of the wavelength. When the tube is exposed to an increase in ambient temperature, the entire tube expands, the end sealings are moved apart and the fiber optic is longitudinally stretched. This results in a longitudinal expansion of the Bragg grating which results in a shift in the wavelength of the spectral peak reflected from the grating. An increase in temperature results in a lengthening of the wavelength. The structure amplifies the effect of ambient pressure or temperature on the fiber grating according to an equation which has several variables including the dimensions, Young's modulus, and Poisson ratio of the tube and the optical fiber. When used as a pressure sensor, the effects of temperature on the sensor may be minimized by using a tube which matches the thermal expansion characteristics of the fiber optic, i.e. fused silica. When used as a temperature sensor, the effects of pressure on the sensor may be minimized by isolating the sensor in a chamber. The sensitivity of the sensor to temperature can be increased by choosing the material of the tube to have a high thermal expansion coefficient.

According to a second embodiment, the mechanical structure includes a tube which is placed over the fiber optic with the Bragg grating being located inside the tube, a filling rod physically coupled to the portion of the fiber optic containing the Bragg grating, one or more rigid rods inside the tube on either side of the filling rod, and two end sealings which physically couple the ends of the tube to respective rigid rods. When the tube is exposed to an increase in ambient pressure, the entire tube is compressed, the end sealings are moved closer together, the rigid rods move closer together compressing the filling rod, and the fiber optic is thereby longitudinally compressed. This results in a longitudinal compression of the Bragg grating which results in a shift in the wavelength of the spectral peak reflected from the grating. The structure provided in the second embodiment amplifies the effects of ambient pressure on the fiber grating according to an equation which has the same variables as the first embodiment equation and also amplifies the effects of pressure by an additional factor which is related to the ratio of the distance between the sealings to the length of the filling material. The effects of temperature on the sensor of the second embodiment can be minimized by choosing one or both of the rigid rods to be made of a material having a thermal expansion coefficient which compensates for the expansion of the tube and the other rod if only one rod is so selected. The structure of the second embodiment can also be used as a temperature sensor if it is isolated from the effects of pressure as described above with reference to the first embodiment. The materials of the tube and rod in the temperature sensor are also preferably selected in terms of their thermal expansion coefficient in order to increase the thermal sensitivity of the sensor.

According to a third embodiment, a filling rod physically coupled to the portion of the fiber optic containing the Bragg grating and a pair of rigid rods on either side of the filling rod are arranged in a housing which is sealed by a pair of diaphragms. Each diaphragm is coupled to a respective rigid rod. When the structure is exposed to an increase in ambient pressure, the diaphragms are deflected, the rigid rods move closer together compressing the filling rod, and the fiber optic is thereby longitudinally compressed. This results in a longitudinal compression of the Bragg grating which results in a shift in the wavelength of the spectral peak reflected from the grating. The structure provided in the third embodiment amplifies the effects of ambient pressure on the fiber grating according to an equation which is related to the length of the filling material, the Young's modulus of the filling material and the diaphragm, and the geometry of the diaphragms and the rods. According to one variant of this embodiment, a hole is provided in each diaphragm and the fiber optic passes through these holes. According to another variant of this embodiment, side holes in the rigid rods and the housing allow the fiber optic to pass through the structure. According to another variant of this embodiment, the structure is formed with a single diaphragm and a single rigid rod. The effects of temperature on the sensors of the third embodiment may be adjusted by choosing materials having thermal expansion coefficients which compensate for the expansion of the several elements of the transducer.

The pressure sensors of the invention may be used to measure either static pressure or dynamic (acoustic) pressure. Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
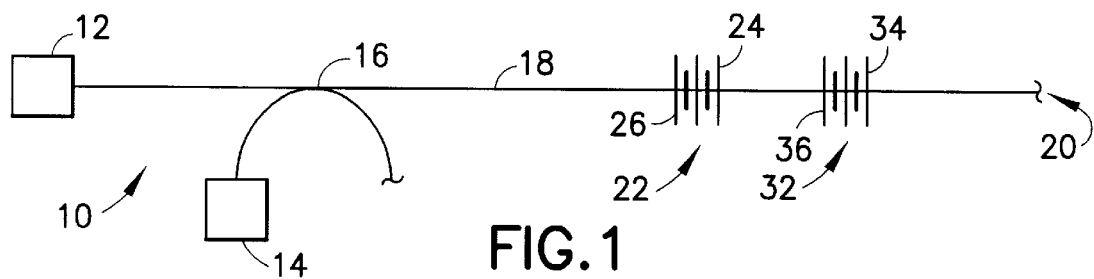
FIG. 1 is a schematic view of a fiber optic sensing system according the invention.

Referring now to FIG. 1, an exemplary fiber optic sensor system 10 according to the invention generally includes a light source 12, a spectral analyzer 14, a fiber beam splitter 16, an optical fiber 18, a low back reflection terminator 20, and one or more fiber optic transducers 22 (32, etc.) each having one or more gratings 24, 26 (34, 36, etc.). The light source 12 may be, e.g. an LED, a tunable laser, a laser diode, or a broadband erbium doped fiber. It is advantageous to use a source which will permit the application of multiple gratings of different wavelengths. The spectral analyzer 14 may be a Fabry-Perot interferometer, an acoustic-optical device, a Michelson interferometer, a Mach-Zehnder interferometer, or another type of known device. The back reflection terminator 20 may be of the type disclosed in U.S. Pat. No. 4,834,493 to Udd et al. The number of transducers and the number of gratings in each transducer is not critical so long as there is at least one transducer with one grating. As will be described in more detail below with reference to FIGS. 3–6, an important feature of the transducers of the present invention is that the optical fiber passes through the transducer thereby enabling the arrangement of a plurality of transducers along a single optical fiber path.

Figure 2:
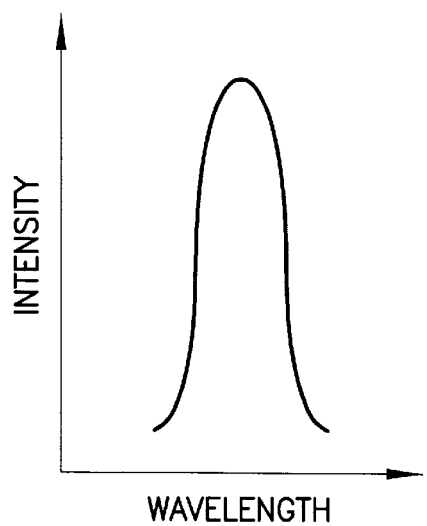
FIG. 2 is a plot illustrating the spectral content of light reflected from a single Bragg grating subjected to longitudinal strain.

According to the invention, the fiber optic transducer(s) 22 (32) is (are) also provided with novel structure which produces enhanced sensitivity and dynamic range as described in more detail below with reference to FIGS. 3–6. The components of the sensing system 10 are arranged substantially as shown in FIG. 1. The light source 12 directs a beam through the beam splitter 16 into the optical fiber 18 such that light enters one end of the fiber optic pressure transducer 22. A spectral portion of the light is reflected back by the grating(s) 24, 26 (34, 36) to the beam splitter 16 which directs the reflected beam onto the spectral analyzer 14. The other output end of the beam splitter 16 may be directed to another set (or sets) of Bragg gratings and pressure transducers (not shown), and if desired, multiple beam-splitters can be utilized with one or more sets of gratings on each fiber. In addition, the sensing system can be operated in a reflection mode as shown, or in a transmission mode with the spectral analyzer 14 located where the reflection terminator 20 is presently shown. Regardless, depending on the number of different gratings provided on the fiber(s), the spectral analyzer will detect one or more spectral peaks as shown in FIG. 2. The wavelength of the peaks will change based on the temperature of and longitudinal strain on the gratings respectively. FIG. 2 illustrates the spectral content of light reflected from a single Bragg grating in an optical fiber subjected to longitudinal strain.

Figure 3:
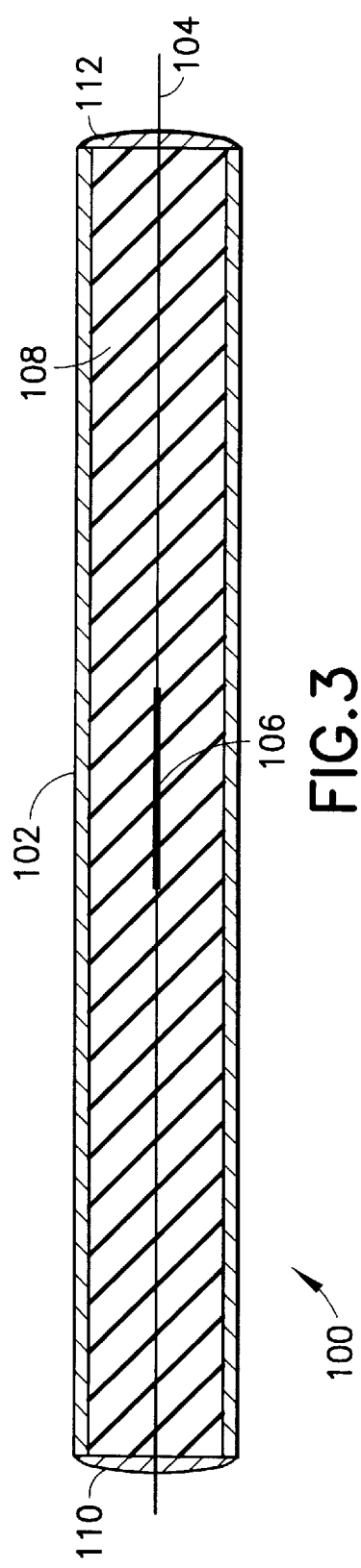
FIG. 3 is a schematic sectional view of a first embodiment of an apparatus for mechanically enhancing the sensitivity of a longitudinally loaded fiber optic sensor.

Turning now to FIG. 3, a first embodiment of a transducer 100 according to the invention includes a tube 102 which is placed over an optical fiber 104 having a Bragg grating 106 located inside the tube 102. As shown in FIG. 3, the Bragg grating 106 is located near the longitudinal and radial midpoint of the tube. However, the Bragg grating may be located longitudinally and/or radially off-center if desired. Regardless, a soft filling material 108 is placed between the tube 102 and the fiber optic 104, and two end sealings 110, 112 are provided which physically couple the ends of the tube 102 to portions of the fiber optic 104 adjacent to the ends of the tube 102. When the tube 102 and end sealings 110, 112 are exposed to an increase in ambient pressure, the entire tube 102 is compressed, the end sealings 110, 112 are moved closer together, and the fiber optic 104 is longitudinally compressed. This results in a longitudinal compression of the Bragg grating 106 which results in a shift in the wavelength of the spectral peak reflected from the grating. The filling material 108 prevents the fiber from buckling. The filling material is preferably a material having a low Young's modulus as compared to the tube and the optical fiber, e.g. silicon rubber. The structure of the tube and end sealings amplifies the effects of ambient pressure on the fiber grating according to Equation 3, below, where $\alpha_1$ is the amplification factor as compared to a bare optical fiber sensor, $Y_{of}$ is the Young's modulus of the optical fiber, $d_o$ is the outside diameter of the tube, $y_t$ is the Young's modulus of the tube, $d_i$ is the inside diameter of the tube, $Y_f$ is the length of the tube, $v_t$ is the Poisson ratio of the tube, $Y_f$ is the Young's modulus of the filling material, $d_{of}$ is the diameter of the optical fiber, and $v_{of}$ is the Poisson ratio of the optical fiber.

$$\alpha_1 = \frac{Y_{of} d_o^2}{\left[ Y_t \left( \frac{d_o^2 - d_i^2}{1 - 2v_t} \right) + Y_f d_i^2 + Y_{of} d_{of}^2 \right](l - 2v_{of})} \quad (3)$$

The effects of temperature on the sensor 100 of the first embodiment may be minimized by using a tube 102 which matches the thermal expansion characteristics of the optical fiber 104, for example, a fused silica tube. As mentioned above, the sensor 100 may also be used as a temperature sensor by containing it in a pressure vessel which prevents pressure outside the vessel from acting on the sensor but which conducts heat to the sensor. The sensitivity of the sensor to temperature can be improved by choosing the material of the tube to have a high thermal expansion coefficient; i.e., higher than silica.

Figure 4:
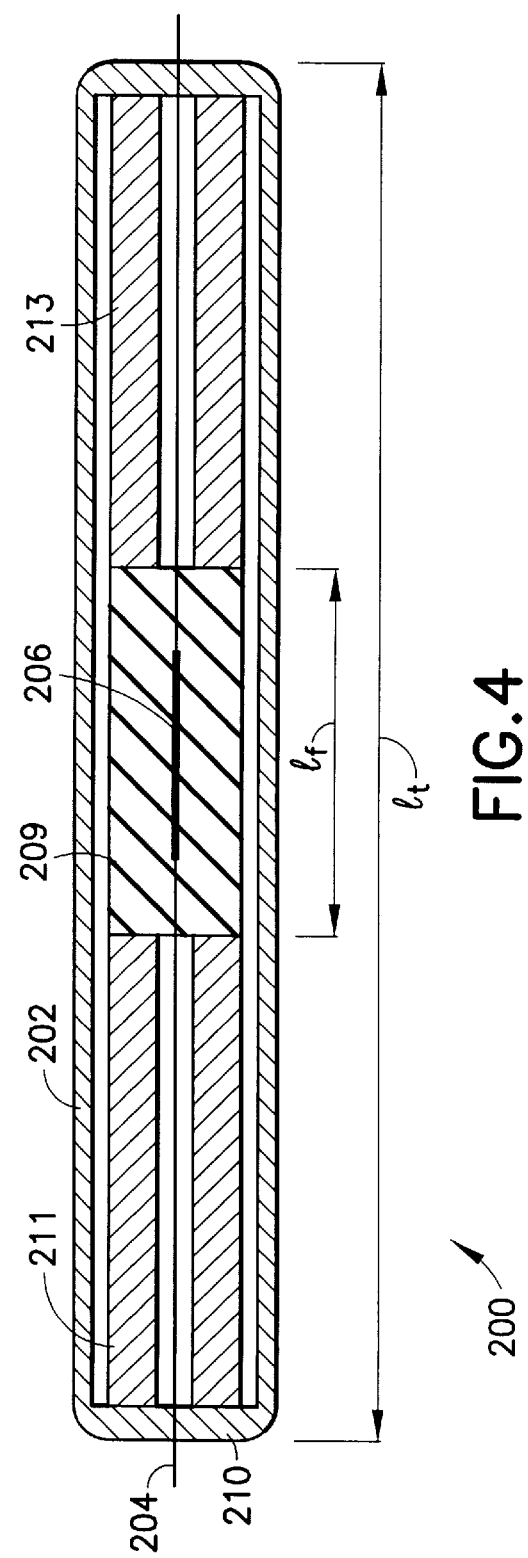
FIG. 4 is a chematic sectional view of a second embodiment of an apparatus for mechanically enhancing the sensitivity of a longitudinally loaded fiber optic sensor.

FIG. 4 shows a second embodiment of a sensor 200 according to the invention. The sensor 200 includes a tube 202 covering an optical fiber 204 having a Bragg grating 206 located inside the tube 202. A filling rod 209 is physically coupled to the portion of the fiber optic 204 containing the Bragg grating 206. A pair of rigid rods 211, 213 are located inside the tube 202 on either side of the filling rod 209. Two end sealings 210, 212 physically couple the ends of the tube 202 to respective rigid rods 211, 213. When the sensor 200 is exposed to an increase in ambient pressure, the entire tube 202 is compressed, the end sealings 210, 212 are moved closer together, the rigid rods 211, 213 move closer together compressing the filling rod 209, and the fiber optic 204 is thereby longitudinally compressed in the region of the Bragg grating 206. This results in a longitudinal compression of the Bragg grating 206 which results in a shift in the wavelength of the spectral peak reflected from the grating. The structure provided in this second embodiment amplifies the effects of ambient pressure on the fiber grating according to two factors, the factor $\alpha_1$ shown in Equation 3, above, and a second factor which is defined by Equation 4, below, where $\alpha_2$ is the final amplification factor, $l_t$ is the length of the tube 202 and $l_f$ is the length of the filling rod 209.

$$\alpha_2 = \alpha_1 \frac{l_t}{l_f} \quad (4)$$

The effects of temperature on the sensor 200 of the second embodiment may be minimized by choosing one or both of the rigid rods 211, 213 to be made of a material having a thermal expansion coefficient which compensates for the thermal expansion of the tube 202 (and which compensates for the thermal expansion of the other rod if only one rod is so selected). As mentioned above, the sensor 200 may also be used as a temperature sensor by containing it in a pressure vessel which prevents pressure outside the vessel from acting on the sensor but which conducts heat to the sensor. Likewise, the materials of the tube and rod can be selected in terms of their thermal expansion coefficients in order to increase the thermal sensitivty of the sensor.

Figure 5:
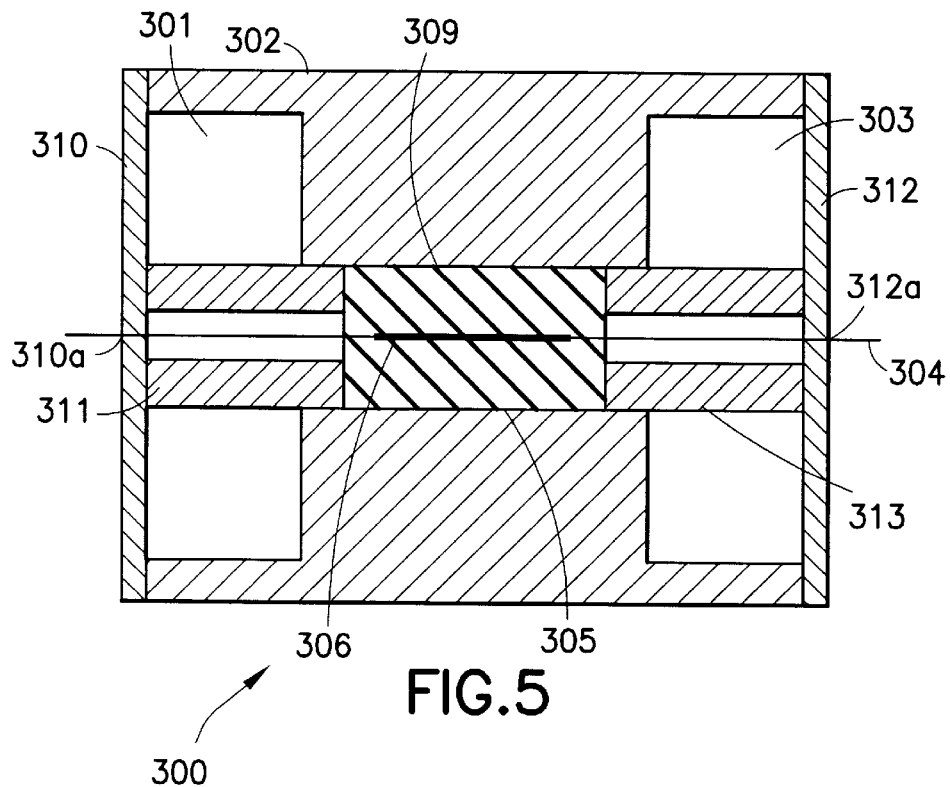
FIG. 5 is a schematic sectional view of a third embodiment of an apparatus for mechanically enhancing the sensitivity of a longitudinally loaded fiber optic sensor.

A third embodiment of the invention is shown in FIG. 5. The sensor 300 shown in FIG. 5 includes a substantially cylindrical housing 302 having a stepped inner diameter which defines two end cavities 301, 303 and a middle cavity 305 which has a smaller diameter than the end cavities. An optical fiber 304 extends through the housing 302 and is provided with a Bragg grating 306 which is located within the middle cavity 305 of the housing 302. A filling rod 309 is physically coupled to the portion of the fiber optic 304 containing the Bragg grating 306. A pair of rigid rods 311, 313 are arranged on either side of the filling rod 309. Respective rigid rods 311, 313 extend entirely through respective end cavities 301, 303 and partially into the middle cavity 305. The end cavities 301, 303 are sealed by respective diaphragms 310, 312, each of which is provided with a central hole 310a, 312a through which the optical fiber 304 passes. The annuli (not shown) between the fiber 304 and the holes 310a, 312a are sealed to maintain isolated pressure in the cavities 301, 303. Each diaphragm 310, 312 is coupled to a respective rigid rod 311, 313. When the structure 300 is exposed to an increase in ambient pressure, the diaphragms 310, 312 are compressed, the rigid rods 311, 313 move closer together compressing the filling rod 309, and the optical fiber 304 is thereby longitudinally compressed in the vicinity of the Bragg grating 306. This results in a longitudinal compression of the Bragg grating 306 which results in a shift in the wavelength of the spectral peak reflected from the grating. The structure 300 provided in the third embodiment amplifies the effects of ambient pressure on the fiber grating 306 according to an equation which is related to the length of the filling material, the Young's modulus of the filling material and diaphragms, and the geometry of the diaphragms and the rods. The effects of temperature on the sensor of the third embodiment can be adjusted by choosing materials of certain transducer elements (e.g., rods) according to their thermal expansion coefficients in order to compensate for the thermal expansion of the diaphragms and housing.

Figure 6:
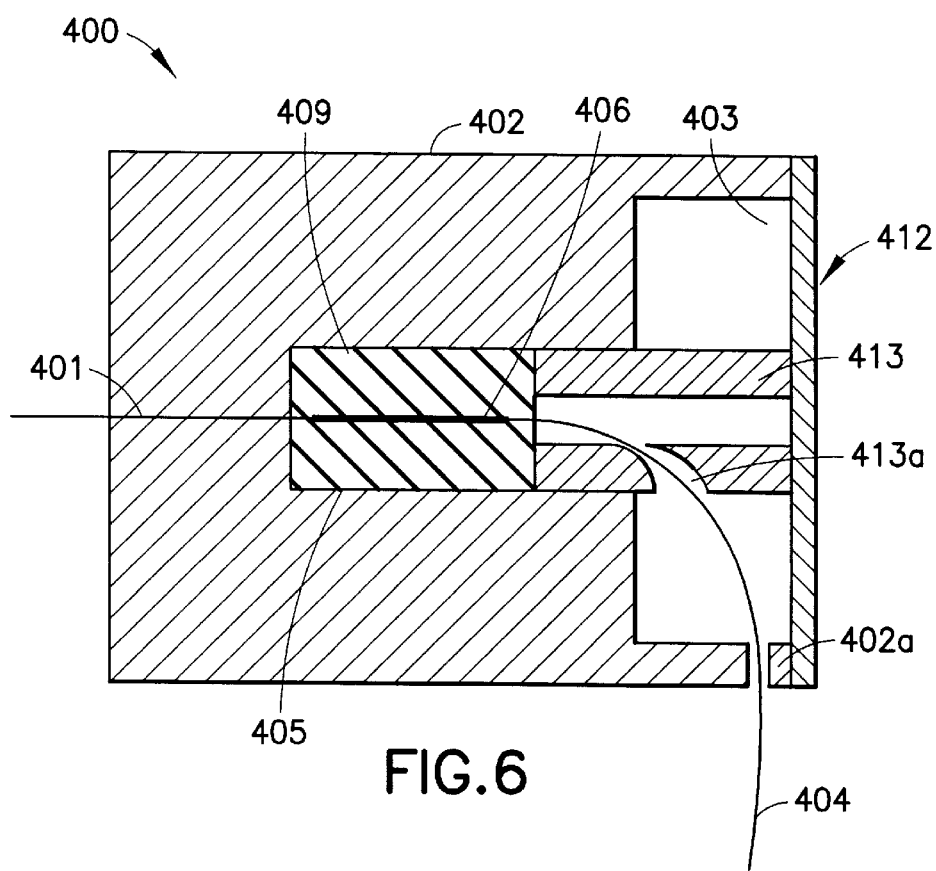
FIG. 6 is a schematic sectional view of an alternate third embodiment of an apparatus for mechanically enhancing the sensitivity of a longitudinally loaded fiber optic sensor.

A variant of the third embodiment is illustrated in FIG. 6. The sensor structure 400 shown in FIG. 6 includes a substantially cylindrical housing 402 having a stepped inner diameter which defines two end cavities 401, 403 and a middle cavity 405. The end cavity 401 has a small diameter and is only large enough to allow an optical fiber 404 to pass therethrough. The cavity 405 is similar in size to the cavity 305 described above an is dimensioned to receive the fiber 406 surrounded by a filling rod 409 which is physically coupled to the portion of the fiber optic 404 containing the Bragg grating 406. The cavity 403 is relatively large and comparable in size to the cavities 301, 303 described above. The cavity 403 is covered by a diaphragm 412 and a hollow rigid rod 413 is arranged extending entirely through cavity 403 and partially into the middle cavity 405, abutting the filling rod 409. According to this embodiment, the rigid rod 413 is provided with a side hole 413a adjacent to the cavity 403 and the housing 402 is provided with a side hole 402a adjacent to the cavity 403. The optical fiber 404 passes through the cavity 401, through the filling rod 409 in the cavity 405, through the hollow rigid rod 413, through the hole 413a in the rigid rod and out of the housing 402 through the side hole 402a. This embodiment obviates the need to seal an annulus between the fiber and the diaphragm. It will be appreciated that this embodiment differs from the embodiment shown in FIG. 5 in two ways: the elimination of holes in diaphragms, and the elimination of one of the two diaphragms. Those skilled in the art will further appreciate that the embodiments of FIGS. 5 and 6 may be varied in several ways. For example, the embodiment of FIG. 5 may be made with only one diaphragm, but without the side hole passage shown in FIG. 6. Further, the embodiment of FIG. 5 may be made with two diaphragms and with two side hole passages for the fiber as suggested by FIG. 6.

The structure shown in FIG. 6 functions in a manner similar to the structure shown in FIG. 5 and the effects of temperature on the sensor 400 can be minimized in the same manner as described with reference to the structure 300.

There have been described and illustrated herein several embodiments of methods and apparatus for measuring pressure with longitudinally loaded fiber optic sensors. While particular embodiments of the invention have been described, it is not intended that the invention be limited thereto, as it is intended that the invention be as broad in scope as the art will allow and that the specification be read likewise. Thus, it will be appreciated that various aspects of different embodiments can be utilized in conjunction with other embodiments of the invention. Also, while processing to determine pressure by locating spectral peaks was indicated, it will be appreciated that peak-related spectral locations could be utilized (e.g., centroids of peaks) instead of actual peaks. Further, while some components have been described as being circular in cross section, it will be understood that the tubes and rods could have non-circular cross sections. It will therefore be appreciated by those skilled in the art that yet other modifications could be made to the provided invention without deviating from its spirit and scope as so claimed.

What is claimed is:

1. A fiber optic transducer, comprising:
    a) a fiber optic having a core having at least one grating formed along at least one portion of said core;
    b) a mechanical structure coupled to said fiber optic core which converts pressure and/or temperature on said mechanical structure to longitudinal strain on said fiber optic core at said grating; and
    c) an intermediate structure between said fiber optic and said mechanical structure, wherein
        said mechanical structure is adapted to allow said fiber optic to pass through and exit said mechanical structure, said fiber optic passes through and exits said mechanical structure, and said intermediate structure is adapted to minimize buckling of, said fiber optic.

2. A fiber optic transducer according to claim 1, wherein:
    said mechanical structure includes a tube covering said fiber optic, said tube having two ends, a pair of sealing members, each end of said tube being sealed by one of said sealing members which physically couples said fiber optic to said tube.

3. A fiber optic transducer according to claim 2, wherein:
    said intermediate structure includes a soft filling between said tube and said fiber optic.

4. A fiber optic transducer according to claim 3, wherein:
    said soft filling has a Young's modulus much lower than that of said tube.

5. A fiber optic transducer according to claim 4, wherein:
    said soft filling is silicon rubber.

6. A fiber optic transducer according to claim 2, wherein:
    said intermediate structure includes a filling rod coupled to said fiber optic in the vicinity of said grating, and
    said mechanical structure includes a pair of rigid rods on either side of said filling rod.

7. A fiber optic transducer according to claim 6, wherein:
    said rigid rods are made of a material having a coefficient of thermal expansion which compensates for the thermal expansion of said tube so that longitudinal strain on said fiber optic is only the result of changes in pressure and not the result of changes in temperature.

8. A fiber optic transducer according to claim 6, wherein:
    said rigid rods are made of a material having a coefficient of thermal expansion which enhances the thermal expansion of said fiber so that longitudinal strain on said fiber optic is mainly the result of changes in temperature.

9. A fiber optic transducer according to claim 1, wherein:
    said mechanical structure includes a housing having a stepped inner diameter defining two end cavities and a middle cavity, a diaphragm covering one of said end cavities, and a rigid rod coupled to said diaphragm and extending partially into said middle cavity, and
    said intermediate structure includes a filling rod coupled to said fiber optic in the vicinity of said grating, said filling rod located in said middle cavity adjacent said rigid rod.

10. A fiber optic transducer according to claim 9, wherein:
    said mechanical structure includes two diaphragms, one covering each end cavity, and two rigid rods, each rigid rod being coupled to a respective diaphragm and partially entering said middle cavity.

11. A fiber optic transducer according to claim 10, wherein:
    each of said diaphragms defines a hole through which said fiber optic passes.

12. A fiber optic transducer according to claim 10, wherein:
    each of said end cavities defines a side hole through which said fiber optic passes.

13. A fiber optic transducer according to claim 12, wherein:
    each of said rigid rods defines a side hole through which said fiber optic passes.

14. A fiber optic transducer according to claim 9, wherein:
    said diaphragm covers a first one of said two end cavities, a second one of said two end cavities being sealed with said fiber optic passing therethrough.

15. A fiber optic transducer according to claim 14, wherein:
    said diaphragm defines a hole through which said fiber optic passes.

16. A fiber optic transducer according to claim 14, wherein:
said first one of said end cavities defines a side hole through which said fiber optic passes.

17. A fiber optic transducer according to claim 16, wherein:
said rigid rod defines a side hole through which said fiber optic passes.

18. A fiber optic sensing system, comprising:
a) a light source;
b) a spectral analyzer; and
c) a fiber optic transducer including
   i) a fiber optic having a core with at least one grating formed along at least one portion thereof,
   ii) pressure and/or temperature responsive means for generating longitudinal strain on said core at said grating, and
   iii) an intermediate structure between said fiber optic and said mechanical structure, wherein
   said light source is arranged to direct light into said core and said spectral analyzer is arranged to detect light exiting said core,
   said pressure and/or temperature responsive means is arranged to allow said fiber optic to pass through and exit said pressure and/or temperature responsive means and said fiber optic passes through and exits said pressure and/or temperature responsive means, and
   said intermediate structure is adapted to minimize buckling of said fiber optic.

19. A fiber optic sensing system according to claim 18, wherein:
said pressure and/or temperature responsive means includes a tube, said tube having two ends, a pair of sealing members, each end of said tube being sealed by one of said sealing members which physically couples said fiber optic to said tube.

20. A fiber optic sensing system according to claim 19, wherein:
said intermediate structure includes a soft filling between said tube and said fiber optic.

21. A fiber optic sensing system according to claim 20, wherein:
said soft filling has a Young's modulus much lower than that of said tube.

22. A fiber optic sensing system according to claim 21, wherein:
said soft filling is silicon rubber.

23. A fiber optic sensing system according to claim 19, wherein:
said intermediate structure includes a filling rod coupled to said fiber optic in the vicinity of said grating, and
said pressure and/or temperature responsive means a pair of rigid rods on either side of said filling rod.

24. A fiber optic sensing system according to claim 23, wherein:
said rigid rods are made of a material having a coefficient of thermal expansion which compensates for the thermal expansion of said tube so that longitudinal strain on said fiber optic is substantially the result of changes in pressure only.

25. A fiber optic sensing system according to claim 23, wherein:
said rigid rods are made of a material having a coefficient of thermal expansion which enhances the thermal expansion of said fiber so that longitudinal strain on said fiber optic is substantially the result of changes in temperature only.

26. A fiber optic sensing system according to claim 18, wherein:
said pressure responsive means includes a substantially cylindrical housing having a stepped inner diameter defining two end cavities and a middle cavity, a diaphragm covering one of said end cavities, and a rigid rod coupled to said diaphragm and extending partially into said middle cavity, and
said intermediate structure includes a filling rod coupled to said fiber optic in the vicinity of said grating, said filling rod located in said middle cavity adjacent said rigid rod.

27. A fiber optic sensing system according to claim 26, wherein:
said pressure responsive means includes two diaphragms, one covering each end cavity and two rigid rods, each rigid rod being coupled to a respective diaphragm and partially entering said middle cavity.

28. A fiber optic sensing system according to claim 27, wherein:
each of said diaphragms defines a hole through which said fiber optic passes.

29. A fiber optic sensing system according to claim 27, wherein:
each of said end cavities defines a side hole through which said fiber optic passes.

30. A fiber optic sensing system according to claim 29, wherein:
each of said rigid rods defines a side hole through which said fiber optic passes.

31. A fiber optic sensing system according to claim 26, wherein:
said diaphragm covers a first one of said two end cavities, a second one of said two end cavities being sealed with said fiber optic passing therethrough.

32. A fiber optic sensing system according to claim 31, wherein:
said diaphragm defines a hole through which said fiber optic passes.

33. A fiber optic sensing system according to claim 31, wherein:
said first one of said end cavities defines a side hole through which said fiber optic passes.

34. A fiber optic sensing system according to claim 33, wherein:
said rigid rod defines a side hole through which said fiber optic passes.

35. A fiber optic sensing system, comprising:
a) a light source;
b) a spectral analyzer;
c) a fiber optic having a core with a plurality of spaced apart gratings formed along at least one portion thereof;
d) a plurality of pressure and/or temperature responsive means for generating longitudinal strain on said core at respective gratings;
e) a corresponding plurality of intermediate structures, each being arranged between said fiber optic and one of said plurality of pressure and/or temperature responsive means, wherein
said light source is arranged to direct light into said core and said spectral analyzer is arranged to detect light exiting said core, said pressure and/or temperature responsive means are each adapted to allow said fiber optic to pass through and exit said pressure and/or temperature responsive means and said fiber optic passes through and exits said pressure responsive means, and said intermediate structure is adapted to minimize buckling of said fiber optic.

36. A method of measuring pressure, comprising:

a) optically coupling a fiber optic grating transducer to a light source, the fiber optic grating transducer including a mechanical structure for converting pressure to longitudinal strain on the grating of the fiber optic, the mechanical structure being arranged to allow the fiber optic to pass through and exit the mechanical structure and the fiber optic passing through and exiting the mechanical structure, and an intermediate structure between the fiber optic and the mechanical structure, the intermediate structure being adapted to minimize buckling of the fiber optic.;

b) directing light from the light source into the core of the fiber optic grating transducer;

c) optically coupling a spectral analyzer to the fiber optic grating transducer; and d) measuring the spectral location related to a spectral peak detected by the spectral analyzer to determine the pressure ambient to the fiber optic grating transducer.

* * * * *